United States Patent
McAdow

[15] 3,697,070
[45] Oct. 10, 1972

[54] METALLIZING COATING COMPOSITIONS

[72] Inventor: Walter R. McAdow, Grosse Pointe Farms, Mich.

[73] Assignee: Mobil Oil Corporation

[22] Filed: June 19, 1970

[21] Appl. No.: 47,881

Related U.S. Application Data

[63] Continuation-in-part of Ser. No. 33,106, April 29, 1970.

[52] U.S. Cl. ............ 106/291, 106/290, 117/130, 117/160, 260/37 M, 260/41 B
[51] Int. Cl. ........................ C09c 1/62, C09c 1/64
[58] Field of Search...260/41 B, 37 M; 106/290, 291; 117/130, 160

[56] References Cited

UNITED STATES PATENTS

| | | | |
|---|---|---|---|
| 3,389,105 | 6/1968 | Bolger | 260/23 |
| 2,941,894 | 6/1960 | McAdow | 106/193 |
| 2,839,378 | 6/1958 | McAdow | 75/.5 |
| 2,947,646 | 8/1960 | Devaney | 106/193 |
| 3,167,525 | 1/1965 | Thomas | 260/41 |

*Primary Examiner*—Morris Liebman
*Assistant Examiner*—Richard Zaitlen
*Attorney*—Oswald G. Hayes, Andrew L. Gaboriault and Mitchell G. Condos

[57] ABSTRACT

Metallizing coating compositions having greater sparkle and glitter are formed by including in the coating composition insoluble resin-supported planar reflective metal flakes in an amount of from about 0.0003 percent to about 0.035 percent of metal (particularly aluminum) based on the weight of the composition. The flakes are supported and rendered more planar by using a metal film surfaced on both sides with a relatively insoluble resinous film having a thickness of at least 0.01 mil. When the supported metal film is broken up to form flakes, the flakes are flatter and reflect light over a larger portion of their surface to permit use in smaller amount.

7 Claims, No Drawings

METALLIZING COATING COMPOSITIONS

This application is a continuation-in-part of application Ser. No. 33,106, filed Apr. 29, 1970, entitled "Metallizing Coating Compositions."

The present invention relates to organic coatings containing separated reflective aluminum flakes which add sparkle to the coated film.

Coatings of the general type under consideration are known and described, for example, in my prior U.S. Pat. Nos. 2,839,378 and 2,941,894 in which vapor deposited aluminum of great covering capacity is broken up and incorporated in a film forming coating vehicle. In said U.S. Pat. 2,941,894, the aluminum is used in amounts of from 0.028 to 0.15 percent aluminum, based on the weight of the composition. This proportion of aluminum was far smaller than was previously needed, but it was enough to produce a brilliant polychromatic finish. However, in the amounts needed to produce the desired metallic lustre, the pigmentation of the coating was partially obscured reducing the contrast between the metallic flake and the background.

Another problem with the known coatings is the tendency for the aluminum flakes to be attacked and dissolved away upon exposure to the elements. Where the aluminum flakes are dissolved away, the darker pigments of the coating show through so that some portions of the surface area are darkened due to corrosion while the remainder of the coating retains the aluminum flakes providing a mottled appearance.

It has now been found that greater sparkle can be provided in the metallizing coating compositions under consideration if the aluminum is used in smaller amount in the form of large insoluble resin-supported flakes of increased planarity so that a greater proportion of the flakes reflect light in unison, thus creating more widely separated areas exhibiting increased sparkle. In this way, each reflecting flake shines more brightly and there is less masking of the pigmentation of the coating. Moreover, the flakes used herein are supported on both sides by resin coatings which are relatively insoluble in the coating solution so that the flakes deposited at the surface of the coating and which provide the desired glitter are protected against corrosion despite being positioned at the surface. As a consequence of this, surface mottling which takes place with the coatings of the prior art, is minimized, if not entirely eliminated, in accordance with the invention.

The invention particularly contemplates the production of thin coatings, e.g., the usual film thicknesses for automotive application are from 1.5–3.5 mils and it is preferred that the flakes used herein have a major planar dimension larger than the thickness of the film. The resin-supported flakes of the invention cannot be used in the amounts previously considered to be customary since the resin-supported flakes protrude through the coating, particularly when the coating is of the usual thickness used for automotive application. In the invention, it has been found that a pronounced glitter can be obtained using small flake proportions which do not result in the flake protrusion referred to.

The aluminum flakes which are utilized in this invention are preferably constituted by vapor deposited aluminum which is extremely thin, as is well known, but the flake is supported on both sides thereof by a resinous film of limited solubility in organic solvents and each of which films are preferably thicker than the aluminum which is sandwiched therebetween. Preferably, the resinous film is at least 0.01 mil in thickness, more preferably at least 0.08 mil. While the film should generally not be so thick as to prevent break-up using an appropriate solvent and mechanical agitation, as in the prior art, the preferred films do not exceed 0.2 mil in thickness.

When a film of aluminum having a thinness associated with vapor deposited aluminum is sandwiched as described and agitated in a liquid medium comprising an organic solvent system which is not capable of substantially dissolving the resin of the film, then the laminated form is retained as the overall film structure is broken up. The thin resin films used herein do not prevent break-up into the desired flakes, but they protect the flakes during break-up and cause the production of flakes which are more planar than heretofore. Without these supporting resin films, the flakes at 600 magnifications are shown to be significantly warped, e.g., they undulate or have curled edges and are wrinkled. This reduced planarity minimizes the proportion of the flake which can simultaneously reflect light from a given source into the eye of a viewer. In the invention it is preferred to use flakes having a planar dimension in excess of 30 microns, preferably in excess of 60 microns, while the largest particles are not much in excess of 200 microns. It is especially preferred to employ flakes which have a planar dimension larger than the thickness of the coating which is formed. As a result, spaced apart flakes in the film are able to reflect the light over a relatively substantial surface area of the flake to provide a pronounced glitter which is especially useful when there are less than 100 reflecting flakes per 5.5 square millimeters of coating, so that the glittering flakes are widely spaced. In this way the coating sparkles in the light as opposed to a more generalized metallic lustre of reduced intensity accompanied by a partial masking of the coating pigmentation.

The supported, more planar aluminum particles used in this invention must be employed in very small amount in order to function, the preferred proportions being entirely below the minimum proportion of 0.028 percent aluminum specified in my U.S. Pat. No. 2,941,894. Thus, preferred proportions in this invention involve from about 0.0005 to 0.025 percent of aluminum, based on the weight of the composition. Even smaller proportions of aluminum on the same basis can be utilized, down to about 0.0003 weight percent. In certain instances when the pigmentation is denser or more darkly colored, it may be desired to increase the proportion of aluminum, but even here it is rarely desirable to exceed the preferred maximum identified hereinbefore. Moreover, the maximum proportion which can be tolerated is only about 0.035 weight percent, far less than the typical proportion used in U.S. Pat. No. 2,941,894. If the weight proportion of aluminum used in the present invention is increased beyond the approximate upper limit specified, then the particles tend to protrude from the coated surface. Accordingly, in the invention, the weight proportions of metal in the flakes are limited as aforesaid to avoid the protrusion.

While the preferred practice of the invention involves vapor deposition of aluminum to form the thin aluminum film which is desired, it will be understood that the specific nature of the aluminum deposition process is of secondary consideration to this invention. Thus, the film of aluminum may be deposited in a vacuum or by electroless deposition, and so long as the aluminum film is sufficiently thick to reflect light, it can be used in this invention. Electroless deposition is illustrated by the decomposition of aluminum hydride as described in U.S. Pat. No. 3,462,288. The upper limit of film thickness is not critical, but is of the order of 20–30 millionths of an inch, though subject to variation depending on the metal selected and economic factors. More particularly, the thickness of the metal film is of the order of about 0.5 to about 25 millionth of an inch, preferably of the order of about 0.5 to 5 millionths of an inch and various methods of producing films of this character are known as described in my said prior patents. The thinnest aluminum films having a thickness of less than 3 millionths of an inch are especially benefitted by this invention since these, in the absence of this invention, are more easily distorted by the agitation used to break the film into flakes. Also, these thinner films have less mass and corrode away more easily when they are at the surface to produce a mottled appearance upon exterior exposure. Further, the combination of thin metal film and insoluble resin coating minimizes settling of the flakes in coating compositions containing the same.

The supported aluminum flakes of this invention are dispersed in a film-forming coating vehicle, the specific nature of which is of secondary significance. The coatings of the present invention are particularly useful in the automotive field as a topcoat for the exterior of the automobile. In this utility, acrylic coatings are today of especial interest and these are illustrated by solution polymers containing 80 to 100 percent of polymerized methyl methacrylate, any balance of the polymer being monoethylenically unsaturated monomer copolymerizable with methyl methacrylate such as other alkyl esters of acrylic or methacrylic acid illustrated by butyl acrylate. Small amounts of acrylic or methacrylic acid may be present if desired. While acrylic polymers of the type used in automotive finishes are particularly preferred in this invention, any lacquer, or coating polymer system, or enamel, may be utilized, whether clear or pigmented, and especially the latter, particularly at high gloss coating systems which are utilized for automotive topcoats. These automotive finishes frequently include cellulosics such as cellulose acetate butyrate and appropriate plasticizers. In this respect, typical acylic automotive finishes which may be used are described in U.S. Pat. No. 2,849,409. My said prior patents disclose further coating vehicles which may be utilized, and these are also useful in this invention.

It is desired to point out that a feature of the present invention is the capacity to utilize the sandwiched aluminum flakes of this invention in aqueous coating compositions. Normally, the high reactive aluminum flakes cannot be used in normally alkaline water medium because the aluminum will react with the water. In this invention, the aluminum is protected so that, as a result of the very small proportion of aluminum which is used, and the fact that the aluminum is substantially unavailable to the aqueous medium, the aluminum particles may be incorporated in an aqueous coating system without ill effect. In this respect, the aluminum sandwich is stripped from the supporting layer using a water miscible organic solvent and the dispersion of aluminum flake in the solvent is then dispersed in the aqueous coating composition.

In this invention, the aluminum film is present in a sandwich or laminate in which both opposed surfaces of the aluminum film are covered with a resinous film which is generally insoluble in the liquid system of the coating composition. The acrylic solution polymers normally used in automotive coatings as well as the other resin systems known to be useful for such purpose, such as the alkyd resin-aminoplast resin blends disclosed in my U.S. Pat. No. 2,941,894, are soluble in one or more of the conventional solvents used in automotive finishes, e.g., mixtures of aromatic hydrocarbons such as xylol and aliphatic hydrocarbons, such as mineral spirits or naphtha, which may be supplemented by ketones such as methyl ethyl ketone or methyl isobutyl ketone. The resins used as a coating to surface the aluminum film on both sides thereof must be relatively insoluble in these same solvent systems. To facilitate removal of the coated aluminum film from the substrate on which it is formed, a resin which is readily soluble in the solvents under consideration is used as a release layer. For example, isobutyl methacrylate is a typical release coating which may be used. Rosin or maleinized rosin or ester gum will further illustrate soluble release layers which may be used. Thus, a laminate is formed and later physically removed from its support, using a solvent which dissolves the release coating holding the laminate on the support. However, the resins used to form the laminate are relatively insoluble and these do not dissolve in the solvent. Upon mechanically disrupting the separated laminate in a solvent medium, there is produced large supported flakes in which the resin surfacing layers remain undissolved to protect the aluminum surface against corrosion and to prevent distortion of the aluminum to improve the planarity of the supported flakes which are produced.

The thickness of the surfacing layers of resin, while of secondary consideration, is nonetheless significant from the standpoint of enhancing the chemical resistance of the laminate. A coating having a thickness of about 0.01 mil is broadly adequate to stiffen the aluminum metal flake and enable the production of the more planar flakes. On the other hand, thicker layers of resin are preferred and it is best that the resinous layer have a thickness of 0.08 mil or more in order to maximize chemical resistance to avoid mottling on exposure and weathering. As a practical matter, the resin films should not exceed about 0.2 mil as noted previously.

Another feature of the invention is the fact that the resin films used to surface the aluminum film may be dyed or pigmented to impart color to the reflected light. Similarly, the aluminum can be colored or anodized and the surfacing resin films can function to seal the color on the aluminum. Numerous decorative effects will be apparent from this capacity to vary the color and appearance of the flakes which are used.

In the production of aluminum film laminates of the type utilized in this invention, it is convenient to employ a support such as polyethylene terephthalate (Mylar) and this support is then coated with a soluble polymer layer release coating in order that this first coating might be easily stripped from the Mylar support upon subsequent treatment with organic solvent. A layer of polymer of limited solubility is then applied having a thickness as discussed hereinbefore and force dried to remove the solvent employed to apply the same. The aluminum film is then applied in any convenient manner, but vapor deposition is preferred. While the thickness of the aluminum film may vary considerably as has been explained, it is convenient to deposit the aluminum in an amount such that there is approximately one-eighth pound of aluminum per 10,000 square feet of surface (about 2 millionths of an inch). Then, a further coating of polymer layer of limited solubility is applied, which may be the same or different from the layer on the other side of the aluminum. This top layer is then force dried forming a sandwich of two layers of relatively insoluble polymer, one on either surface of the film of metal. This sandwich is positioned on the Mylar support and retained thereon by the release coating. The composite of support, release coating and sandwich or laminate is run through a bath of solvent (preferably acetone, which may be heated if desired) which dissolves the release coating and the sandwich comes off the Mylar support (usually with the aid of mechanical manipulation supplied by running the composite over rollers). This provides a slurry of partially broken up sandwich in organic solvent and this slurry is mixed with a stirrer to further break up the sandwich, without delamination, into flakes of desired size. Simple stirring is normally adequate to break up the sandwich into flakes, but higher speed agitation may be used if simple stirring proves inadequate.

The relatively insoluble resins which are contemplated for surfacing the aluminum film in order to produce the laminate or sandwich which is desired are subject to considerable variations so long as they are relatively insoluble in ordinary organic solvents of the type which may be utilized to remove the laminate from the support on which it was formed and to dissolve the resins to be used in the ultimate coating composition. To illustrate these relatively insoluble resins, reference is made to copolymers containing 50–80 percent acrylonitrile, the balance of the copolymer being illustrated by ethyl acrylate. These copolymers are soluble in relatively strong solvents such as dimethyl formamide, but they will not dissolve in the more conventional solvents of lesser activity such as acetone. Similarly, polyvinyl butyral is relatively insoluble in aromatic solvents and ketones, and it may be dissolved and applied using alcoholic solvents. Moreover, Mylar itself is soluble in low concentration in cresylic acids and can be applied from solution therein.

It should be understood that while the resins utilized to surface the opposite surfaces of the aluminum film must be insoluble in the solvent which is utilized, this does not preclude limited swelling of the resin in the solvent medium. In this respect, it will be appreciated that the resin films are not intended to prevent break-up of the released laminate into flakes and limited swelling of the resin film in the solvent medium may enhance resin break-up.

Insofar as application of the resin film is concerned, the resin is preferably applied from solvent solution medium followed by removal of the solvent by volatilization (preferably using force drying in which heated air is blown over the wet coating to dry the same). Curing conditions for a limited thermosetting cure may be used, assuming the support and the release coating can withstand the temperatures involved. Relatively strong solvents may be used for application since they are rapidly evaporated so as to avoid unduly injuring the supporting materials.

The concentration of resin in the solvent solution helps to determine the thickness of the films. Since thin films are desired, low solids content solutions are preferred, e.g., 3–15 percent solids.

The present invention will be illustrated by a composite in which a support layer of polyethylene terephthalate film 0.69 mil thick (Mylar) is first surfaced with a release coating constituted by polyisobutyl methacrylate. If desired, one may instead use a copolymer of methyl methacrylate and isobutyl acrylate in a weight ratio of 92/8. Also, one may use maleic modified ester gum or rosin or gelatin.

After the release coating has been dried, a 0.10–0.15 mil thick film of a copolymer of 40 percent ethyl acrylate and 60 percent acrylonitrile is deposited thereover. This copolymer may be made by copolymerizing the monomers at 25 percent solids in solution in dimethyl formamide in the presence of 1 percent benzoyl peroxide catalyst, the reaction being carried out at reflux for 8 hours. The solution of resin so-obtained is then diluted with additional dimethyl formamide to a viscosity enabling roll coat application and the coating is force dried.

After drying, the layer of ethyl acrylate/acrylonitrile copolymer is surfaced with a vapor deposited aluminum film weighing one-eighth pound per 10,000 square feet, whereupon a top layer of the same ethyl acrylate/acrylonitrile copolymer is applied to the exposed aluminum film surface, as by roll coating, in a thickness of 0.10–0.15 mil.

The result is a composite which can be removed by running the same through an appropriate organic solvent (acetone) with the composite being run under and over rolls or bars to help the resin-coated aluminum film sandwich to separate from the Mylar support. Thereafter, ordinary agitation can be utilized to reduce the supported aluminum flakes to desired size.

In the preferred practice of this invention, agitation is continued until about 95 percent by weight of the flakes have a major dimension in the range of 30–80 microns.

In place of the ethyl acrylate/acrylonitrile copolymer noted above, one may use a 5 percent solution of polyvinyl butyral in a 50/50 weight ratio mixture of ethanol and butanol. This deposits a film of resin on the aluminum film which does not dissolve in the aromatic and ketone solvents used to release the sandwich. This film of resin also does not dissolve in the solution coating compositions in which the resin supported flakes are incorporated. Union Carbide Corporation polyvinyl butyrate XYSG and XYHL illustrate commercial products which may be used.

Also, one may employ a 5 percent solution of polyethylene terephthalate in cresylic acid in place of the ethyl acrylate/acrylonitrile copolymer solution.

There is produced as described above a slurry of resin-supported aluminum flakes and these are dispersed in the selected coating composition in an amount to provide the weight of metal described hereinbefore. In preferred practice, the aluminum content of the final metallizing coating composition is 0.01 percent by weight.

While the coating composition itself is subject to considerable variation, a preferred coating composition is illustrated by combining 50 parts of a methyl methacrylate copolymer with 30 parts of a polyester plasticizer and 20 parts of cellulose acetate butyrate, the solvents being aromatic hydrocarbons and ketones. A preferred methyl methacrylate copolymer contains 92 percent of methyl methacrylate and 8 percent of isobutyl acrylate and is supplied as a 40 percent solids solution in 3/1 blend of toluol and methyl ethyl ketone. An appropriate polyester plasticizer contains 37.7 percent neopentyl glycol; 22.9 percent pelargonic acid; 21.0 percent isophthalic acid; and 18.4 percent adipic acid. This polyester is supplied as a 95 percent solids solution in xylene. The cellulose acetate butyrate is used as a 25 percent solids solution in toluol and acetone.

By mixing the three solutions in the form recited, a preferred coating vehicle is obtained. If desired, a small proportion of the methyl methacrylate copolymer (2 percent by weight) may be replaced by another methyl methacrylate copolymer providing increased adhesion, e.g., a copolymer containing 79 percent methyl methacrylate; 8 percent isobutyl acrylate; 8 percent methacrylic acid; and 5 percent of any conventional adhesion promoting agent. Thus, the methacrylic acid can be reacted with propylene imine. Another known variation is to replace the methacrylic acid with glycidyl methacrylate which may be aminated or ammoniated as desired. Still another known variation is to replace the methacrylic acid with an amino acrylate. All of these and other similar expedients are well known to enhance the adhesion of a methacrylate coating system to a substrate base and may be used if desired.

The solvent system for the methacrylate polymer containing the adhesion promoting agent can be the same as that used for the methyl methacrylate polymer which does not contain the adhesion promoter.

The coating composition may be used clear, but it is preferred to pigment the same in accordance with conventional practice.

The invention is of particular interest to pigmented coatings in which a pigment is dispersed in the coating composition to provide a desirable background for the reflective aluminum flakes which are relied upon for brilliance and sparkle. Appropriate pigments for coating compositions are well known, the pigments more usually employed in the formation of automotive coatings include carbon black, phthalocyanine green, phthalocyanine blue, ferrite yellow, red iron oxide, titanium dioxide, iron blue, chromium tetrahydrate, lead chromate and indanthrone blue. Numerous other pigments are also used. On the other hand and while pigmentation is normally present, the supported planar flakes can be employed in clear coatings as taught herein, especially when these clear coatings are deposited atop a previously applied pigmented coating.

Thus, in a preferred coating, a film of vapor deposited aluminum having a thickness of about 2 millionths of an inch and weighing about one-eighth pound per 10,000 square feet of surface and coated with insoluble resin on both sides in a thickness of 0.10–0.15 mil as previously described, is stripped from a Mylar support, using acetone to produce a slurry, which slurry is broken up by agitation so that about 95 percent by weight of the metal is in the form of flakes having their largest planar dimension in the range of 30–80 microns. This slurry is then incorporated in the paint in an amount to provide 0.01 percent by weight of aluminum based on the weight of the paint. The paint is constituted by the mixture of three solutions described hereinbefore, this mixture being pigmented by the incorporation therein of 2.3 parts of phthalocyanine green pigment and 0.5 part of ferrite yellow pigment per 100 parts of paint. This provides a green automotive metallic lacquer which, when sprayed on primed metal and baked to remove the solvent, will deposit a high gloss finish having a thickness of 1–2 mils and containing less than 100 metal flakes which are near the exposed surface and, therefore, highly reflective. The coating exhibits great sparkle and glitter in the light, despite the small amount of aluminum in the flakes which are present.

Although the coatings of this invention contain fewer metal flakes than were previously needed to produce a pronounced metallic glitter, the sparkle of the coating is greater than heretofore because each flake provides more glitter so that the flakes become useful in lesser concentration. Further, with less flakes in the coating, the background pigmentation is not obscured and the contrast between the glittering flakes and the background is increased.

The present invention has been described with particular reference to the utilization of aluminum, since aluminum is especially preferred from the standpoint of its availability, the ease with which it can be vapor deposited or otherwise manipulated and because of its high reflectivity in the extreme thinness under consideration. On the other hand, other metals capable of providing reflective surfaces when deposited in the thinness under consideration can also be used. Among these metals may be mentioned silver, copper, gold, tin, nickel, chromium, palladium, platinum, rhodium, and alloys of the foregoing.

While the invention is primarily directed to flakes which are supported by insoluble coatings on both sides thereof in order to maximize the planarity of the flake and its resistance to corrosion, the novel attributes of the invention are achieved to a limited extent through the utilization of a solvent-insoluble coating of the type described herein on only one side of the flake which may be either the side adjacent the release coating or the opposite side. In either event, the insoluble coating supports the film of metal as it is broken up into flakes which minimizes the disfigurement of the flake and provides improved corrosion resistance on one side thereof.

It is also of interest to note that the resin-surfaced aluminum flakes used in this invention are insulated from one another and, as a result, coating compositions containing the same can be subjected to a high voltage electrostatic charge without arcing. This has significance in the automotive industry where electrostatic coating processes are frequently used. The compositions of the invention may even be atomized electrostatically as part of the electrostatic coating process.

The invention is defined in the claims which follow.

I claim:

1. A method of producing reflective metal flakes exhibiting improved planarity comprising coating a support consecutively with a solvent-soluble release coating, solvent insoluble resin, metal film having a thickness less than 30 millionths of an inch and more solvent insoluble resin, said solvent insoluble resin coating forming films having a thickness which is thicker than the film of metal, removing a laminate of metal film surfaced on both sides with a film of solvent insoluble resin from said support by dissolving away said release coating with organic solvent to form a slurry of removed laminate in said solvent, and agitating said slurry to break-up said laminate into flakes having a planar dimension in excess of 30 microns with said insoluble film on said metal film maintaining the planarity of the metal film in the flakes which are formed.

2. A method as recited in claim 1 in which said metal film is vapor deposited aluminum.

3. A method as recited in claim 2 in which said flakes have their largest planar dimension in the range of from about 30 to about 200 microns and a thickness of about 0.5 up to about 25 millionths of an inch.

4. A method as recited in claim 1 in which said insoluble resin films have a thickness of at least 0.01 mil.

5. A method as recited in claim 1 in which said flakes are based on an aluminum film having a thickness of the order of about 0.5 to 5 millionth of an inch.

6. A method as recited in claim 1 in which said metal flakes are constituted by a film of aluminum surfaced on both sides with resin films insoluble in acetone, and said organic solvent is acetone.

7. A suspension of metal flakes in organic solvent produced by the method of claim 1.

* * * * *